US011571764B2

(12) United States Patent
Huetter et al.

(10) Patent No.: US 11,571,764 B2
(45) Date of Patent: Feb. 7, 2023

(54) WELD OVERLAY MACHINE ASSEMBLY

(71) Applicant: TURN2 SPECIALTY COMPANIES LLC, Baytown, TX (US)

(72) Inventors: Paul Huetter, Le Roy, NY (US); Gary Wahl, Le Roy, NY (US)

(73) Assignee: TURN2 SPECIALTY COMPANIES LLC, Baytown, TX (US)

( * ) Notice: Subject to any disclaimer, the term of this patent is extended or adjusted under 35 U.S.C. 154(b) by 543 days.

(21) Appl. No.: 16/694,661

(22) Filed: Nov. 25, 2019

(65) Prior Publication Data
US 2020/0164454 A1 May 28, 2020

Related U.S. Application Data

(60) Provisional application No. 62/771,134, filed on Nov. 25, 2018.

(51) Int. Cl.
*B23K 9/04* (2006.01)
*B23K 9/12* (2006.01)
*B23K 37/02* (2006.01)
*B23K 9/127* (2006.01)

(52) U.S. Cl.
CPC .............. *B23K 9/048* (2013.01); *B23K 9/122* (2013.01); *B23K 9/1278* (2013.01); *B23K 37/0276* (2013.01); *B23K 37/0282* (2013.01)

(58) Field of Classification Search
CPC ...... B23K 9/048; B23K 9/122; B23K 9/1278; B23K 37/0276; B23K 37/0282; B23K 9/0284
See application file for complete search history.

(56) References Cited

U.S. PATENT DOCUMENTS

| X996406 | | 6/1911 | Hall et al. |
|---|---|---|---|
| 2,818,494 | A | 12/1957 | Bernard et al. |
| 4,101,755 | A * | 7/1978 | Uratani ................. B23K 37/02 901/14 |
| 4,260,869 | A | 4/1981 | Slavens et al. |
| 4,456,228 | A | 6/1984 | Cable et al. |
| 5,205,469 | A | 4/1993 | Capitanescu |
| 5,558,268 | A | 9/1996 | Acheson |

(Continued)

OTHER PUBLICATIONS

Screen captures from YouTube video clip entitled "Encompass Machine Gen II Overlay Weld System"; 8 pages, uploaded on Aug. 9, 2011 by user "ctilley2211"; Retrieved from internet: https://www.youtube.com/watch?v=im5i-7i3V1k.

*Primary Examiner* — Brian W Jennison
(74) *Attorney, Agent, or Firm* — K&L Gates LLP

(57) ABSTRACT

A weld overlay machine assembly includes a carriage to support a hinged index bar and a wire feed assembly. The index bar has an auto height control unit and an index assembly to locate the position of a weld torch relative to the index bar. The assembly is configured to adjust the index bar to interior contours of the vessel while applying a layer of overlay material to a surface therein. The assembly runs along a track in the interior of the vessel. The assembly is configured to transition from sides of the vessel to that of the top or bottom domes wherein the curve of the domes are perpendicular to that of the radial sides. This transition is done without the need to add or remove components to the assembly. This is accomplished by providing the pivoting of the index bar relative to the track.

16 Claims, 7 Drawing Sheets

(56) References Cited

U.S. PATENT DOCUMENTS

| | | | |
|---|---|---|---|
| 9,266,198 B1 * | 2/2016 | Snead | B23K 37/0264 |
| 2005/0150721 A1 | 7/2005 | Fujiwara et al. | |
| 2005/0224467 A1 | 10/2005 | Val et al. | |
| 2006/0144835 A1 * | 7/2006 | Pan | B23K 37/0264 |
| | | | 219/124.34 |
| 2018/0281122 A1 | 10/2018 | King et al. | |

* cited by examiner

WELD OVERLAY MACHINE ASSEMBLY

CLAIM OF PRIORITY

This application claims the benefit of U.S. Provisional Application No. 62/771,134, filed 25 Nov. 2018. The information contained therein is hereby incorporated by reference.

BACKGROUND

1. Field of the Invention

The present application relates generally to a system designed to lay a bead of material around an interior or a tank, and in particular to a system that is configured to pivot about rounded interior contours during operation.

2. Description of Related Art

Weld overlay is a welding procedure that puts weld metal on the surface of a metallic material. Whereas welding is most commonly thought to be associated with the joining of two metallic materials, weld overlaying is a process that "overlays" the weld metal on the surface of a secondary metal. Generally, this is used for corrosion resistance or wear resistance and frequently a different material is used for the overlay material than for the base metal.

This process is needed in a number of industry sectors where service conditions require corrosion resistant properties. The overlay assembly coats the base metal with a corrosion resistant alloy to protect the base metal. Readily available base materials may be used in an effort to minimize costs and time restraints. In all, a weld overlay process provides the assurance of a heavy-duty metallurgically-bonded protective layer that will not be undermined or dislodged in service.

A wide range of applications can benefit from anti-corrosion weld overlay, including pipelines, flanges, valves, vessels and specialist subsea equipment. An array of component shapes and sizes can be coated, most commonly a tank defining an interior volume. In use, the overlay assemblies run around the interior surface to be coated on a track. The overlay material is fed through a machine and a torch is used to bond the two together. An overlay assembly follows a designated path to ensure full coverage of the base material. An issue arises however where the interior surface of the base metal is curved, such as a tank, wherein the radius of the curve is perpendicular to that of the main body. An example would be the top and bottom domes of the tank. Conventional overlay machines are not adapted for operation at the transition between the sides of a cylindrical body to that of the top or bottom domes. The index bar, automatic height control, and oscillator have to be removed from the overlay assembly and a Cone/dome assembly has to be attached to the overlay assembly. The automatic height control and oscillator have to be attached to the newly added cone/dome assembly. This provides unnecessary delay and increased costs.

Although great strides have been made with respect to protecting base metals using an overlay assembly, considerable shortcomings remain. A new overlay machine welding assembly is needed that is suited for transitioning between curved walls of a tank, namely the dome portions and the sides of the tank all without necessitating manual removal and installation of distinct and separate parts to the assembly.

SUMMARY OF THE INVENTION

It is an object of the present application to provide a weld overlay machine assembly configured to conform and adapt to interior contours of a tank. The assembly applies a layer of overlay material to an interior contour of a vessel, such as a tank. The assembly runs along a track in the interior of the vessel. The assembly is configured to permit for the transition from sides of the vessel to that of the top or bottom domes wherein the curve of the domes are perpendicular to that of the radial sides. This transition is done without the need to add or remove components to the assembly. This is accomplished by providing the pivoting of the index bar perpendicular to and relative to the track.

Another object of the present application is to provide the ability to have the index bar with the ability to orient itself either above or below the track as needed depending on the positioning in the tank. The index bar can rotate potentially upwards of 180 degrees or more. The position of the torch is also adjustable to compensate for changes in distance between the torch and the walls of the vessel as the index bar pivots radially away from the surface of the tank.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
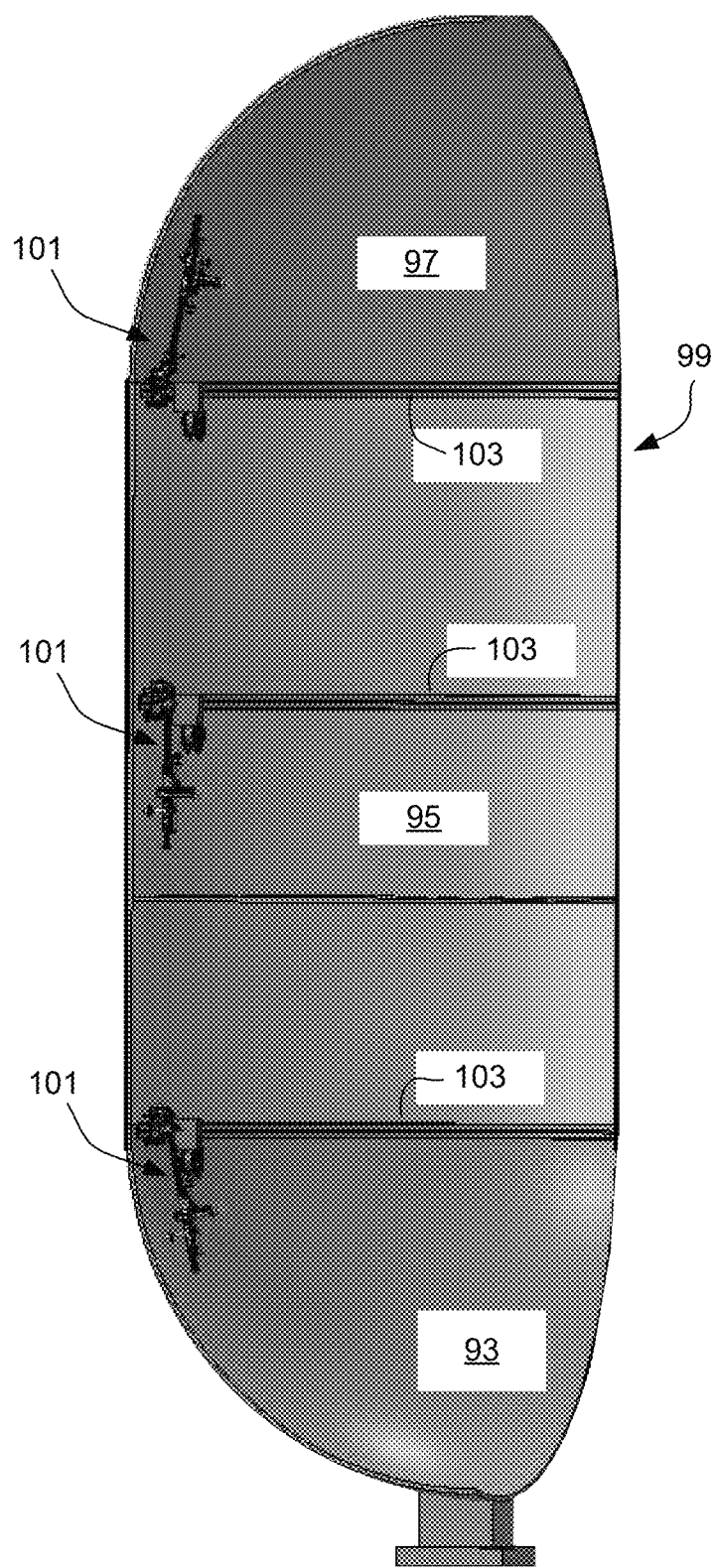
FIG. 1 is a side section view of a tank having a weld overlay machine assembly shown in three representative portions of the tank according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. Specifically, the weld overlay machine assembly of the present application is configured to conform and adapt to interior contours of a tank so as to facilitate a transition from the sides of the tank to that of the top or bottom domes without the need to add or remove components to the assembly. The assembly is configured to permit for the pivoting of the index bar which allows the torch to swing in an outward movement as needed. The index bar may be oriented either above or below the track as needed depending on the positioning in the tank. The position of the torch is also adjustable to compensate for changes in distance between the torch and the walls of the tank as the index bar pivots radially away from the surface of the tank. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The embodiments and method of the present application is illustrated in the associated drawings. The weld overlay machine assembly includes an overlay carriage that is configured to translate along a track attached to the tank. Extending off the overlay carriage is an index bar with a linear rail actuator configured to regulate an up and down movement along the index bar. Off the linear rail actuator is an automatic height control oscillator that locates the torch front and back to a particular distance from the interior surface of the tank. The index bar is hinged to permit rotation about an axis adjacent to the overlay carriage. The index bar may be mounted either above or below the overlay carriage to facilitate operation with both the upper portion of a tank and the lower portion of the tank. Additional features and functions are illustrated and discussed below.

Referring now to the Figures wherein like reference characters identify corresponding or similar elements in form and function throughout the several views.

The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIG. 1 in the drawings, a section view of a vessel 99 (i.e. a tank) is provided with a weld overlay machine assembly 101 illustrated at three distinct exemplary positions therein. Tank 99 has an upper portion 97 (upper dome), a central portion 95, and a lower portion 93 (lower dome). Central portion 95 is cylindrical with an interior surface that is fully circular extending along a linear axis for a designated distance. Tank 99 defines an interior side. Upper portion 97 and lower portion 93 act to cap off the ends of central portion 95 which results in the interior surface forming a concave shape as it extends toward the central axis of central portion 95. This curve is perpendicular to the sides of portion 95 and prevents conventional overlay machines from operating in upper portion 97 and lower portion 93 without modification and swapping of parts to compensate for the curve of each dome. As seen in FIG. 1, assembly 101 is depicted in an operational condition in all three portions 93, 95, 97 of tank 99. This is partially made possible by the use of a hinged index bar. Assembly 101 traverses track 103 and is configured to lay a weld overlay across the surface of tank 99.

It is understood that tank 99 is used merely as an example vessel that may be used with assembly 101. Other vessels and surfaces exist suitable for use with assembly 101. Tank 99 was selected for illustrative purposes to show the features and functions of assembly 101 in a singular simplified manner. Although 3 distinct assemblies 101 are shown in FIG. 1, a singular assembly 101 is merely shown in 3 exemplary positions and may be used to traverse all interior surfaces of tank 99. In other words, three distinct assemblies 101 are shown for visual reference to see assembly 101 in an operable condition in each portion 93,95,97 wherein the index bar position and angle is adjusted.

Figure 2:
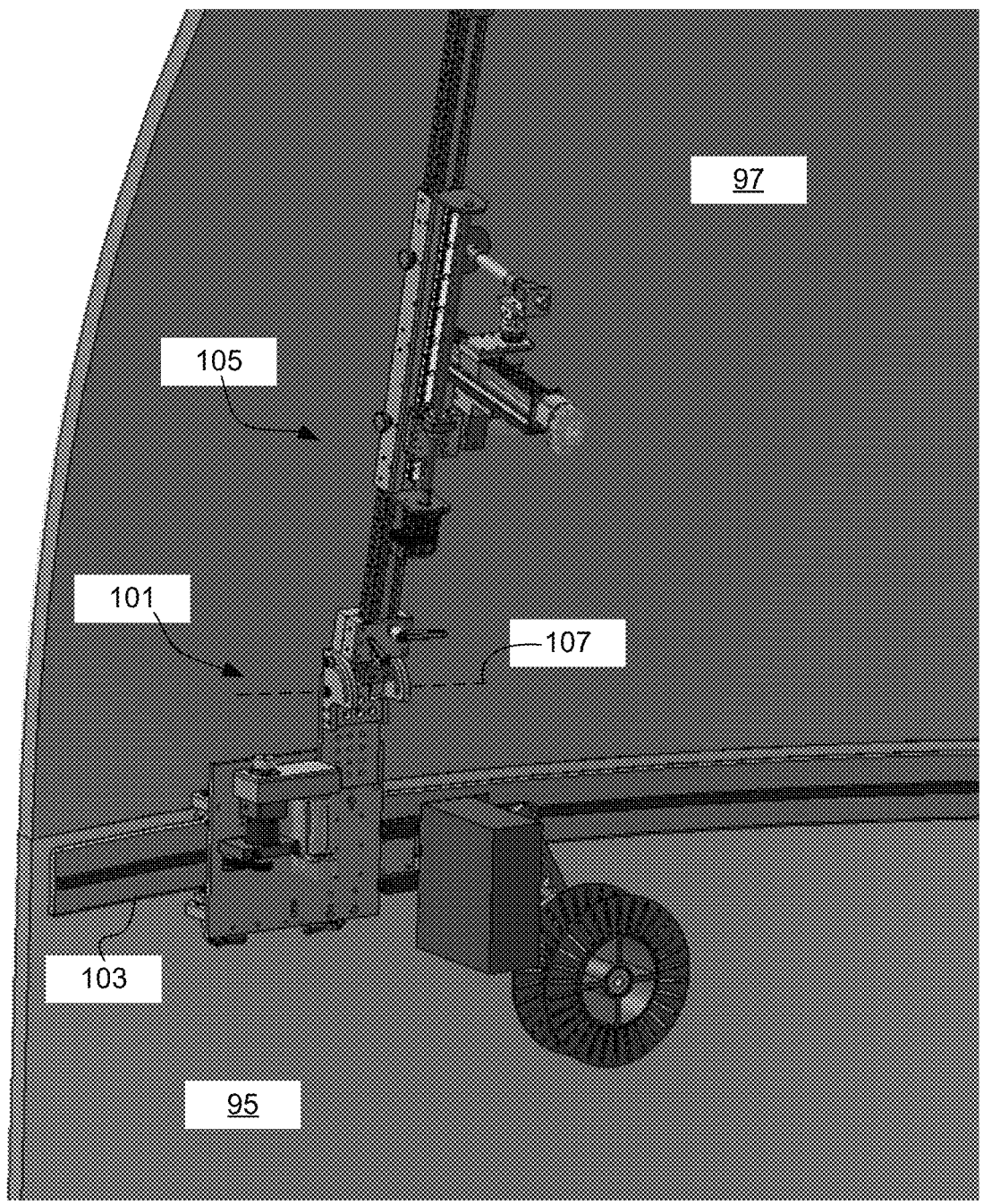
FIG. 2 is an enlarged perspective view of the weld overlay machine assembly of FIG. 1 at a transition between a center portion of the tank and a top dome of the tank.
Figure 3:
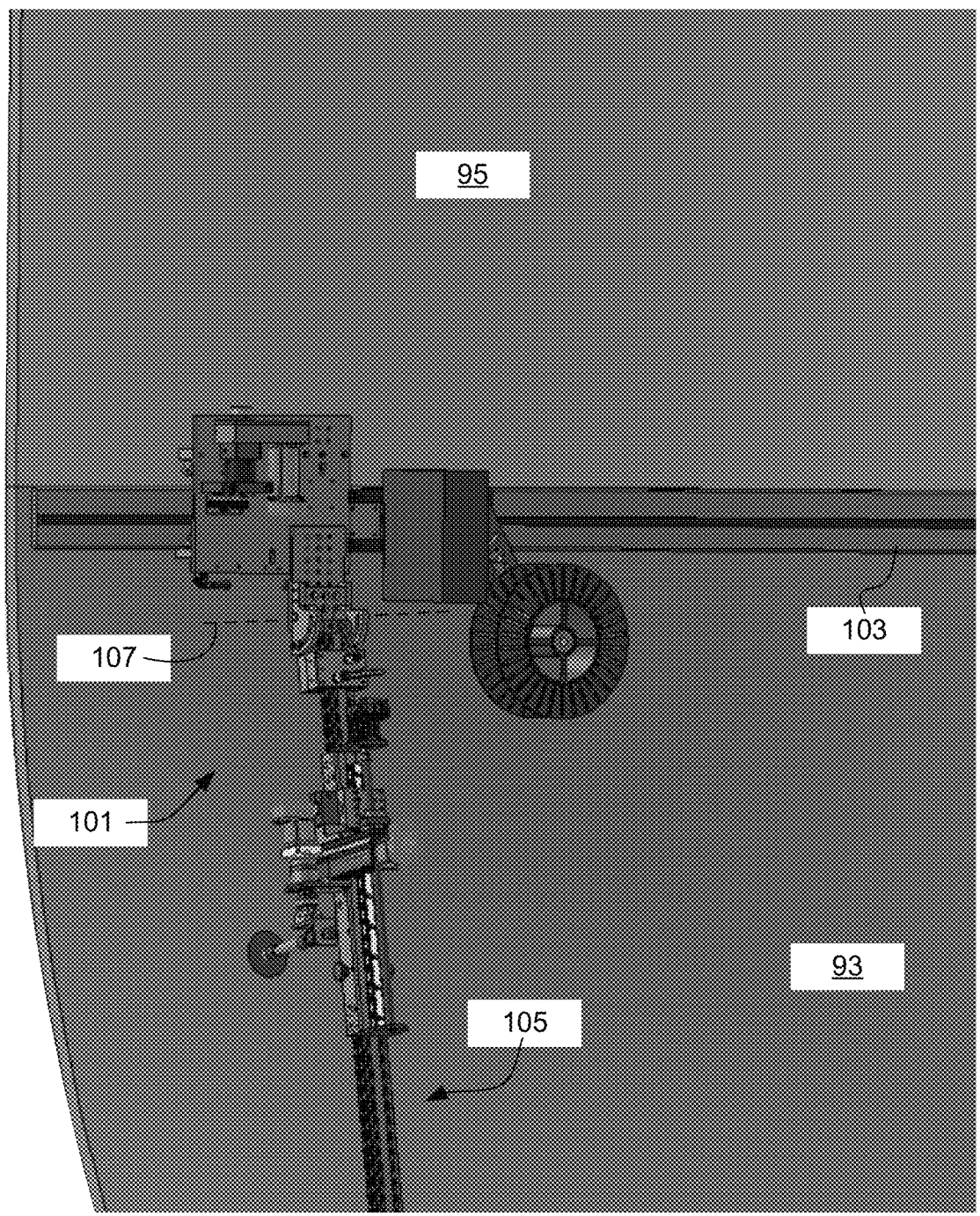
FIG. 3 is an enlarged perspective view of the weld overlay machine assembly of FIG. 1 at a transition between a center portion of the tank and a bottom dome of the tank.

Referring now also to FIGS. 2-3 in the drawings, enlarged perspective views at the transitions of tank 99 between each set of portions is illustrated. In FIG. 2, assembly 101 is shown partially in central portion 95 and upper portion 97. In FIG. 3, assembly 101 is shown partially in central portion 95 and lower portion 93. Assembly 101 includes an index bar 105 that is configured to pivot about an axis 107. Along axis 107, the radial orientation of index bar 105 is selectively adjustable to allow for changes in distance within portions 97 and 93. For example, the further into the curved surface assembly 101 operates, the more radial movement, away from vertical, index bar 105 rotates. This radial pivoting allows assembly 101 to operate within a linear surface of central portion 95 and subsequently transition into a curved surface seen with portion 93 and 97 without the need to add or interchange parts or assemblies.

Figure 4:
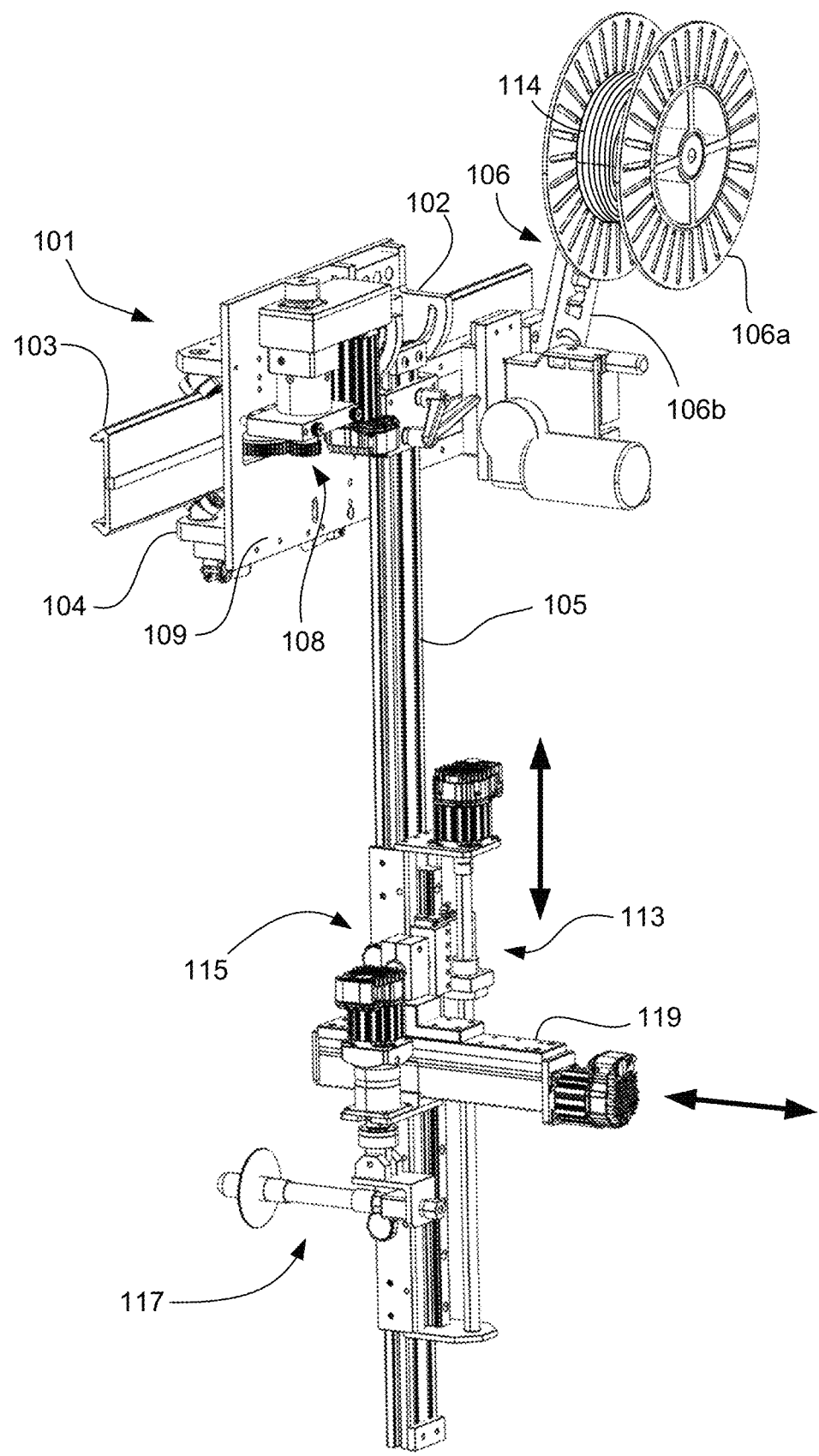
FIG. 4 is a perspective view of the weld overlay machine assembly of FIG. 1.
Figure 5:
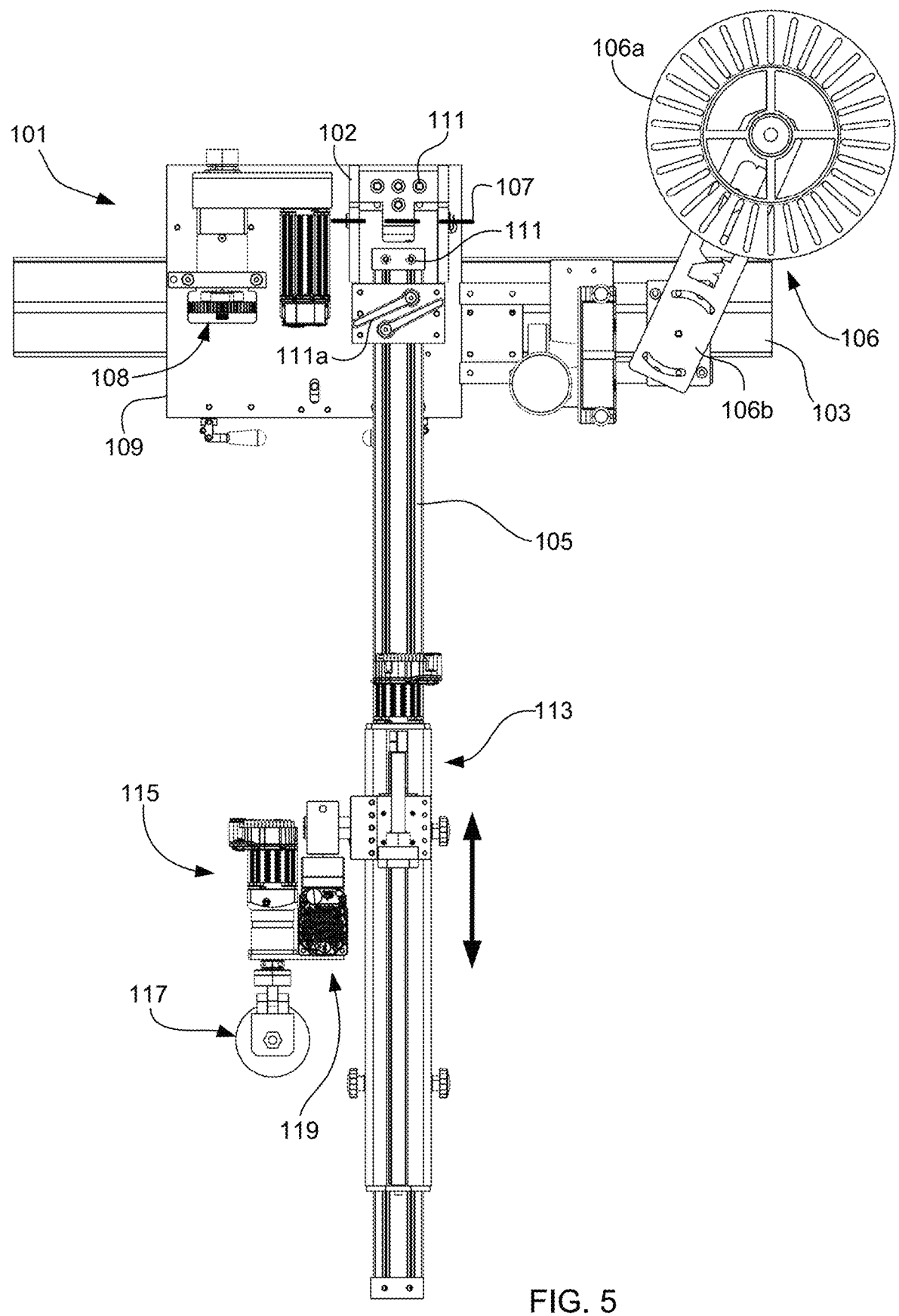
FIG. 5 is a front view of the weld overlay machine assembly of FIG. 4.

Referring now also to FIGS. 4 and 5 in the drawings, views of assembly 101 are provided. As noted above, assembly 101 moves along track 103 around the interior circumference of tank 99. Assembly 101 is configured to weld a bead of material across the surface of tank 99. A wire feed assembly 106 is used to hold and distribute wire feed/material 114. Assembly 106 may include a spool 106a and a wire feed mast 106b. Mast 106b is configured to pivot a within a set radial range. Spool 106a rotates freely relative to mast 106b.

The movements of assembly 101 are calculated and accurate along track 103 to ensure proper coverage. Assembly 101 includes an overlay carriage 109 in communication with track 105. Carriage 109 regulates the movement of assembly 101 along track 103. Carriage 109 may include one of any number of circuitry and electrical components to monitor and regulate performance within tank 99. For example, a travel assembly 108 may be coupled to carriage 109 and engages track 103 via one or more gears to facilitate movement. Carriage 109 is coupled to a mount 104 in direct communication with track 103.

Index bar 105 is coupled to the mount 106 and/or carriage 109 through a mount plate 102. Mount plate 102 permits the rotation of index bar 105. Movement of index bar 105 will be described in greater detail with FIGS. 6 and 7. It is understood that this rotational movement allows for the adjustment relative to the dome surface in portions 97 and 93. Index bar 105 is configured to be releasable such that it may be flipped about axis 107 to transition its position for operation with either the upper portion 97 or the lower portion 93. A plurality of fasteners 111 are used to releasably secure index bar 105 and/or plate 102 within assembly 101. These may be selectively loosened to permit the repositioning of index bar 105 to accommodate different dome surfaces. Fasteners 111a are also optionally used to help secure index bar 105 to carriage 109.

The physical nature of this type of hinged or swiveled attachment is not to be limited to the embodiment depicted. There are a number of ways to facilitate the pivoting or swiveling of the index bar 105 along a first end adjacent to carriage 109. Additionally, index bar 105 may be coupled directly to either carriage 109 or mount plate 102. It should be understood that the length of index bar 105 is set at a predetermined length. By interchanging index bar 105, a user may select the desired length. This may be done by cutting index bar 105 to a particular length and having a plurality of bar lengths available.

As seen in the figures, index bar 105 is shown as extending in a downward orientation relative to track 103. Assembly 101 further includes an index assembly 113, such as a linear rail actuator. Assembly 113 is coupled to an automatic height control unit/oscillator 115, both used to locate the position of a torch 117 a selected distance away from the surface of tank 99. Together they permit movement along two planes of motion. Both actuator 113 and oscillator 115 facilitate linear movement of torch 117. Each may be operable through one or more motors or electronics for example. Torch 117 applies heat to wire feed 114 so as to apply the overlay to tank 99.

A track is formed along the length of index bar 105 to permit movement of actuator 113 in a vertical or linear direction. Additionally, an actuator 119 is used within oscillator 115 to facilitate horizontal linear movements (in/out). These devices allow for the up/down motions and the in/out motions of torch 117. It should be understood that oscillator 115 may be coupled with a swivel attachment to actuator 113 to allow for more fine radial movements of torch 117 independent of index bar 105. Additionally, oscillator 115 may be releasable and able to be positioned either side of actuator 113 with either a left-hand mount or right-hand mount. The pivoting movements and releasable coupling methods of oscillator 115 may be similar in form and function to that of index bar 105 and mount 102.

Figure 6:
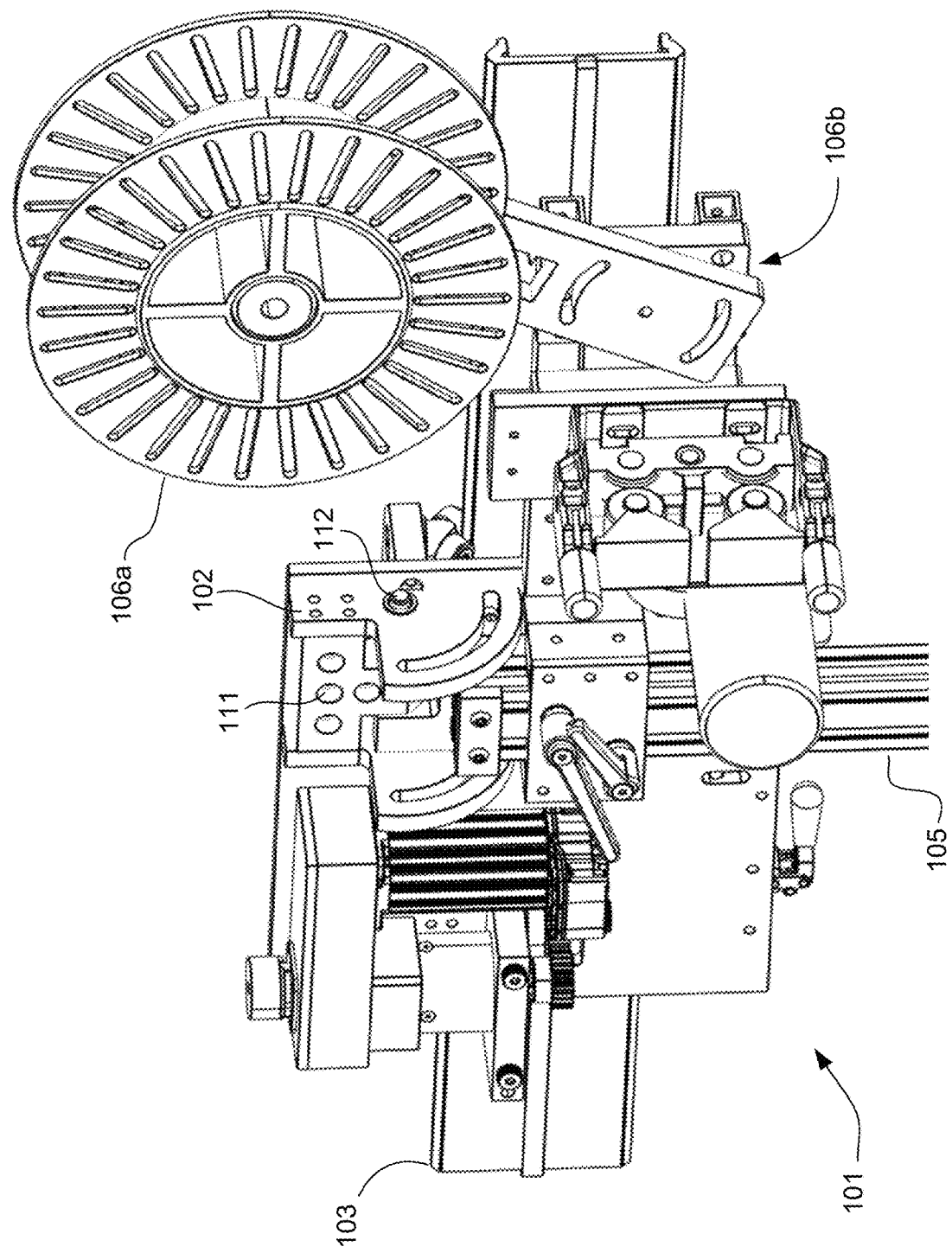
FIGS. 6 and 7 are an enlarged perspective views of the weld overlay machine assembly of FIGS. 4 and 5 showing a pivoting index bar.
Figure 7:
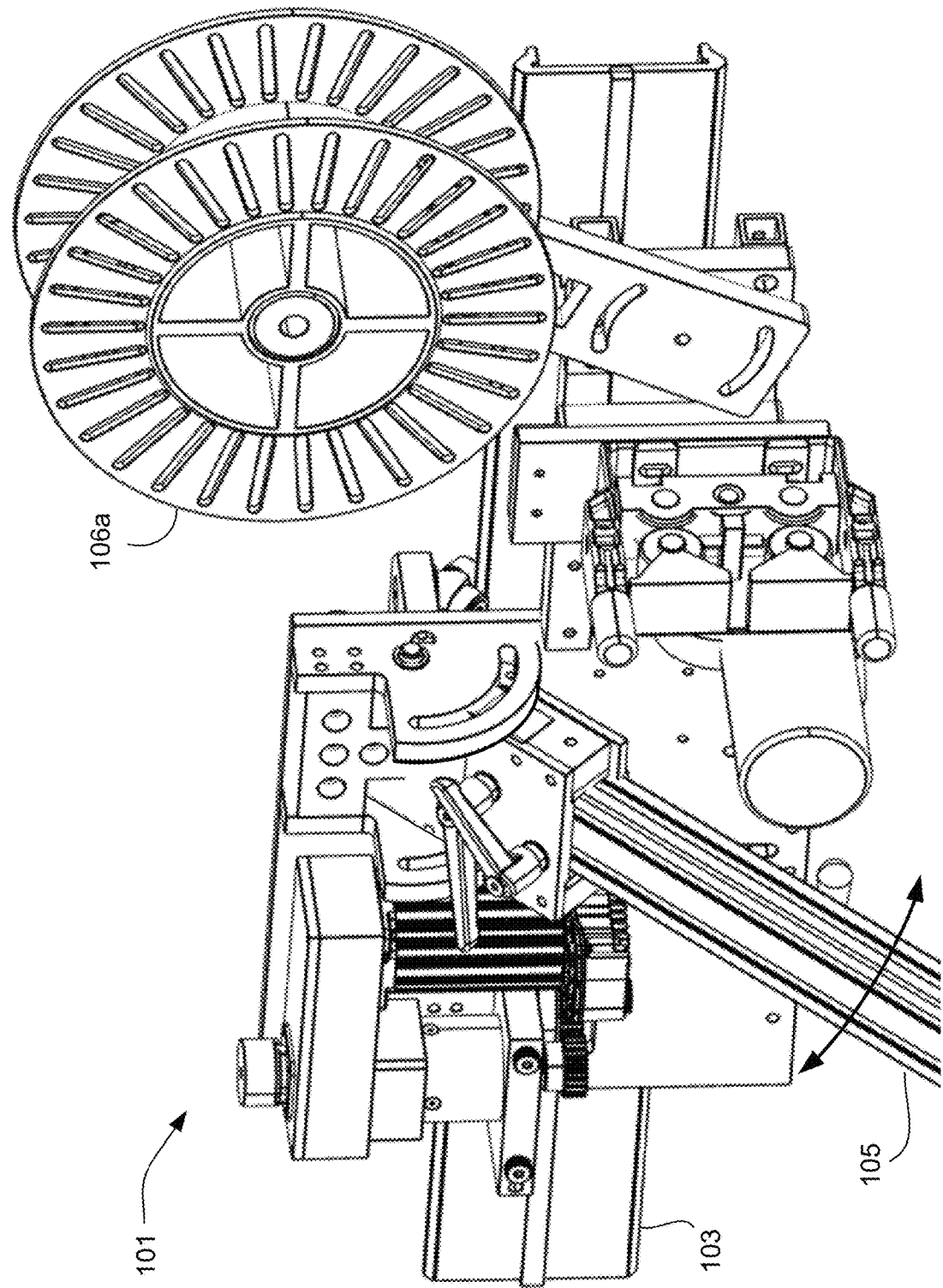

Referring now also to FIGS. 6 and 7 in the drawings, enlarged perspective views showing the movement of index bar 105 is illustrated. This is only meant to be one type or exemplary manner in which index bar 105 may be configured to rotate about a hinged axis. As seen in the figures, a number of fasteners 111 are shown. Fasteners may be bots, screws, or any other type of releasable fastener. A plurality of apertures are provided to allow an operator to select the particular position on carriage 109 for the radial operation of index bar 105. In FIG. 6, index bar 105 is shown in a first orientation, relatively vertical. In FIG. 7, index bar 105 is shown pivoted about pin 112 wherein an angle greater than zero exists between the position of FIG. 6 and the position of FIG. 7. As noted previously, removal of fasteners 111 can allow for plate 102 and index bar 105 to be rotated to a secondary position such that index bar extends upward. This is useful when locating overlay in an upper dome portion 93 as seen in FIG. 2. Presently as shown in FIGS. 6 and 7, assembly 101 is used for center portion 95 and lower portion 93.

In operation, a user locates the carriage on a track. The track is coupled to the surface of the vessel. The index bar is hingedly mounted to the carriage to permit the selective pivoting of the index bar. The feed wire is fed to the weld torch located along the index bar. The position of the weld torch is then adjusted to compensate for curvature of the surface. The index bar is configured to pivot about an axis to follow the curvature of the surface of the vessel. It is understood that the index bar may be interchanged by loosening at least one fastener associated therewith. The mounting plate may be detached, where so equipped. The index bar may be interchanged to vary the length of the index bar. Additionally, a user may cut the index bar to length at any time. When needed, the position of the index bar may be switched relative to the carriage to permit operation with either dome within the vessel. Ultimately, the position of the weld torch is adjustable relative to the index bar and when combined with the pivoting feature of the index bar, the weld torch is operable with curved surfaces perpendicular with the track.

Particular advantages of system 101 include at least the following: (1) a hinged or pivoting index bar that allows the index bar to swing radially outward and inward; (2) the ability to flip the index bar so as to extend upward or downward relative to the overlay carriage; (3) linear movements of the torch being facilitated by movement along the index bar and the oscillator; (4) ability to swivel the oscillator relative to the linear rail actuator; and (5) interchangeable index bar to facilitate different length index bars.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An overlay machine assembly for navigating a track, comprising:
    a carriage moveably coupled along the track, the track configured for attachment to an interior of a vessel;
    a wire feed assembly configured to distribute wire feed, the wire feed assembly in communication with the carriage;
    an index bar coupled to the carriage at a first end, the index bar being hinged to allow pivoting relative to the track;
    an index assembly configured to traverse along the index bar; and
    an auto height control unit configured to regulate a position of a weld torch relative to the track, the weld torch configured to heat the wire feed.

2. The assembly of claim 1, wherein the wire feed is passed to the weld torch.

3. The assembly of claim 1, wherein the position of the weld torch is adjustable.

4. The assembly of claim 1, wherein the index assembly is configured to move the weld torch in a first linear plane.

5. The assembly of claim 4, wherein the auto height control unit configured to move the weld torch in a second linear plane, the auto height control unit being coupled to the index assembly.

6. The assembly of claim 1, wherein the auto height control unit is configured to move the weld torch in a second linear plane.

7. The assembly of claim 6, wherein the auto height control unit is coupled to the index assembly.

8. The assembly of claim 1, wherein the angle of the index bar to the carriage adjusts to a contour of a surface within a vessel.

9. The assembly of claim 1, wherein the index bar is releasably coupled to permit a different position of the index bar relative to the carriage.

10. The assembly of claim 1, wherein the index bar is coupled to a mount plate, the mount plate being positionable in at least two positions.

11. A method of applying an overlay to a surface of a vessel, comprising:
    locating a carriage on a track, the track being coupled to an interior contour of the surface of the vessel;
    hingedly mounting an index bar to the carriage to permit selective pivoting of the index bar;
    feeding a wire to a weld torch located along the index bar; and
    automatically adjusting the position of the weld torch to compensate for curvature of the surface relative to the track;
    wherein the index bar is configured to pivot about an axis to follow the curvature of the surface of the vessel.

12. The method of claim 11, further comprising:
interchanging the index bar by loosening at least one fastener.

13. The method of claim 11, further comprising:
cutting the index bar to length.

14. The method of claim 11, further comprising:
switching the position of the index bar relative to the carriage.

15. The method of claim 14, further comprising:
detaching a mounting plate from the carriage, the index bar pivotally mounted to the mounting plate.

16. The method of claim 11, wherein the position of the weld torch is adjustable relative to the index.

* * * * *